US012759671B2

(12) United States Patent
Fischer

(10) Patent No.: US 12,759,671 B2
(45) Date of Patent: Oct. 13, 2026

(54) RETRACTABLE BOAT CENTER CONSOLE ENCLOSURE DEVICE

(71) Applicant: Douglas Fischer, Wetumpka, AL (US)

(72) Inventor: Douglas Fischer, Wetumpka, AL (US)

( * ) Notice: Subject to any disclaimer, the term of this patent is extended or adjusted under 35 U.S.C. 154(b) by 301 days.

(21) Appl. No.: 18/638,015

(22) Filed: Apr. 17, 2024

(65) Prior Publication Data

US 2024/0400160 A1 Dec. 5, 2024

Related U.S. Application Data

(60) Provisional application No. 63/471,104, filed on Jun. 5, 2023.

(51) Int. Cl.
*B63B 17/02* (2006.01)
*E05F 11/02* (2006.01)
*E05F 15/50* (2015.01)
*E05F 15/603* (2015.01)

(52) U.S. Cl.
CPC .............. *B63B 17/02* (2013.01); *E05F 11/02* (2013.01); *E05F 15/50* (2015.01); *E05F 15/603* (2015.01); *E05Y 2900/514* (2013.01)

(58) Field of Classification Search
CPC ............ B63B 17/00; B63B 2017/0045; B63B 2017/0054; B63B 17/02; B63B 17/023; B63B 17/026; E05F 11/02; E05F 15/50; E05F 15/57; E05F 15/603; E05F 15/665; E05Y 2900/514; E05Y 2201/22; E05Y 2201/684; E05Y 2800/21
USPC .......................................... 114/343, 361, 364
See application file for complete search history.

(56) References Cited

U.S. PATENT DOCUMENTS 5,016,558 A * 5/1991 Oehler .................... B63B 17/02 114/361
6,167,658 B1 1/2001 Weiner
7,370,597 B1 * 5/2008 Schwindaman ........ B63B 17/02 114/361
7,395,774 B2 7/2008 Borges
7,484,472 B1 * 2/2009 Highfield ................ B63B 17/02 114/361
7,571,691 B2 * 8/2009 Russikoff ................ B63B 17/02 114/361
7,895,964 B2 * 3/2011 Russikoff ................ B63B 17/02 114/361
8,359,994 B1 * 1/2013 Highfield ................ B63B 19/18 114/361
9,862,461 B2 * 1/2018 Cao ......................... B63B 17/02
10,450,036 B2 10/2019 Killian
2007/0137553 A1 6/2007 Murray
2008/0022916 A1 1/2008 Borges
2018/0057113 A1 3/2018 Killian

* cited by examiner

*Primary Examiner* — Daniel V Venne
(74) *Attorney, Agent, or Firm* — Brennan, Manna & Diamond, LLC

(57) ABSTRACT

A retractable boat center console enclosure device is disclosed that can be installed on an open center console of a boat. The retractable boat center console enclosure device comprises a body component that is configured in a plurality of sections which act to cover the center console of the boat. A double wall component is positioned in the port and starboard sides with a motorized track so that the body component could rise up over the gunnels of the sides to contour to the boat. The retractable sides then meet in the center of the hull approximately six feet in height to snap together.

20 Claims, 4 Drawing Sheets

RETRACTABLE BOAT CENTER CONSOLE ENCLOSURE DEVICE

CROSS-REFERENCE TO RELATED APPLICATION

The present application claims priority to, and the benefit of, U.S. Provisional Application No. 63/471,104, which was filed on Jun. 5, 2023, and is incorporated herein by reference in its entirety.

FIELD OF THE INVENTION

The present invention relates generally to the field of retractable boat center console enclosure devices. More specifically, the present invention relates to a cover for a boat center console that can be easily retracted and extended. Accordingly, the present disclosure makes specific reference thereto. Nonetheless, it is to be appreciated that aspects of the present invention are also equally applicable to other like applications, devices, and methods of manufacture.

BACKGROUND

By way of background, this invention relates to improvements in retractable boat center console enclosure devices. Generally, many boats have an open center console area. This area remains exposed to the elements, even during a storm. This is undesirable, as a user may be affected by inclement weather and cannot comfortably use the center console area.

Generally, boats are used in environments in which the contents of the boat are subjected to moisture and other conditions that can have a detrimental effect on their durability and longevity. Covers are often used during use and non-use in order to protect the boat's contents. However, the process for covering a boat and securing the cover in place can be a time consuming process. The cover itself can be a heavy item and it must be lifted and positioned in its proper orientation.

Accordingly, there is a demand for an improved retractable boat center console enclosure device that covers a boat center console to provide a portable cabin in inclement weather. More particularly, there is a demand for a retractable boat center console enclosure device that can be easily retracted and extended, as needed.

Therefore, there exists a long-felt need in the art for a retractable boat center console enclosure device that provides users with a cover for a boat center console. There is also a long-felt need in the art for a retractable boat center console enclosure device that can be easily retracted and extended. Further, there is a long-felt need in the art for a retractable boat center console enclosure device that can be extended/retracted manually, electronically, or hydraulically. Moreover, there is a long-felt need in the art for a device that is attached via snap fasteners. Further, there is a long-felt need in the art for a retractable boat center console enclosure device that is completely enclosed from the center console forward to the bow and waterproof. Finally, there is a long-felt need in the art for a retractable boat center console enclosure device that is manufactured of poly carbon or other poly fiber or plexi-glass material to allow retraction for full enclosure and marine vinyl.

The subject matter disclosed and claimed herein, in one embodiment thereof, comprises a retractable boat center console enclosure device. The device can be installed on an open center console of a boat. The retractable boat center console enclosure device comprises a body component that is configured in a plurality of sections which act to cover the center console to the bow of the boat. A double wall component is positioned in the port and starboard sides with a motorized track so that the body component could rise up over the gunnels of the sides to contour to the boat. The retractable sides then meet in the center of the hull approximately six feet in height to snap together.

In this manner, the retractable boat center console enclosure device of the present invention accomplishes all of the forgoing objectives and provides users with a device that covers a center console of a boat. The device can be easily retracted or extended. The device can be manufactured of a carbon fiber, poly fiber or plexi-glass material.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a retractable boat center console enclosure device. The device can be installed on an open center console of a boat. The retractable boat center console enclosure device comprises a body component that is configured in a plurality of sections which act to cover the center console of the boat. A double wall component is positioned on the port and starboard sides with a motorized track so that the body component could rise up over the gunnels of the sides to contour to the boat. The retractable sides then meet in the center of the hull approximately six feet in height to snap together.

In one embodiment, the retractable boat center console enclosure device is a cover for a boat center console that provides a portable cabin in inclement weather. The device is easily retracted and extended, as needed. The device can be installed on an open center console of a boat, which the size of the vessel can range from approximately 40 to 65 feet. Further, the device can be applied on any boat that contains an open center console, as well as, catamarans and V-hull vessels, etc.

In one embodiment, the retractable boat center console enclosure device is applied to a boat with a deck and gunnels, a frame structure, and an open center console. The retractable boat center console enclosure device comprises a body component that is configured in a plurality of sections which act to cover the center console of the boat to the bow. The sections can be any suitable size and shape as needed. Accordingly, the dimensions and angles would vary with the size of the hull and width of the boat.

In one embodiment, each side of the boat (i.e., port and starboard) comprises retractable body component sections that are of sufficient length to be capable of being extended from the side of the boat toward the center ridgeline, with a sufficient amount of material to overlap each other at the center ridgeline. Further, the retractable body component sections are secured together along the ridgeline in the center of the hull in an overlapping configuration via fasteners, such that the body component is waterproof when extended in position over the center console area.

In one embodiment, the body component can be manufactured of a metal alloy, carbon fiber, plexi-glass, fiberglass, plastics, polymers, etc., or any other suitable material as is known in the art.

In one embodiment, the retractable body component sections are secured and stored within a double wall component. The double wall component is positioned on the port and starboard sides of the boat, along the center console area. The double wall component can be any suitable shape and size as is known in the art and is positioned along the sides of the boat and acts to secure the retractable body component sections for storage and use.

In one embodiment, each double wall component comprises a motorized track secured to the body component sections, allowing the body component sections to extend and retract, as needed. The motorized track is secured to the body component sections, which run along the length of the boat, spaced apart at a predetermined distance, such that the body component sections completely cover the center console area when extended. Specifically, the retractable body component sections rise up over the gunnels on the sides to contour to the boat. The motorized track then acts as a semi-rigid guide that allows the body component sections to cover and provide a portable cabin during inclement weather over the center console.

In one embodiment, the retractable body component is aerodynamically shaped or tapered toward the front, such that the device does not create a flat wall or wind barrier, during use. However, the retractable body component can be any suitable shape and size as is known in the art, when extended, depending on the wants and/or needs of a user.

In one embodiment, the retractable body component, positioned on both sides of the boat, then meets in the center of the hull approximately six to eight feet in height to fasten together. Typically, the retractable body component is secured together via snaps, Velcro, marine vinyl, etc. In another embodiment, the retractable body component can be secured together via closure latches or marine zippers. Closure latches are secured to the underside of the body component ridgeline (i.e., center). Closure latches are similar to suitcase or toolbox latches and once secure, help to cinch the seam of the body component sections together tightly preventing water from getting in. Any suitable number of closure latches can be utilized as is known in the art. Typically, four or five closure latches are positioned along the body component ridgeline, and thus evenly spaced along the seam of the device.

In one embodiment, the retractable body component sections each comprise a rubber overlap to ensure the device is waterproof. The rubber overlap acts like a hinge on each side of the body component sections to ensure the top portion of the retractable body component sections fold inward with another section and rubber overlap to create an overlapping seal, which prevents water from getting in. The retractable body component sections can also comprise a tortuous path seal, or other suitable seal that prevents water from getting in.

In one embodiment, the front and the rear of the device would not be a solid piece, as it would have to be more flexible and have marine vinyl in the front tip and the rear. Further, a piece of vinyl can also be placed overtop the ridgeline seal, to keep water from running in under the convertible device. The piece of vinyl can be secured via Velcro, snaps, adhesive, etc.

Operation of the retractable boat center console enclosure device can be accomplished in many different ways, such as manually, electronically, or hydraulically, etc. Generally, the track comprises a motor connected to it, and a controller connected to the motor for controlling the motor. The controller communicates with the motor which controls the retraction and/or expansion of the body component sections. In one embodiment, a rechargeable battery is then connected to the controller and provides a power source for the motor. In another embodiment, the motor is powered via the boat's batteries and electronics.

In one embodiment, the double wall components comprise a drive member which is coupled to the motor. The motor is housed proximately to the drive member and can be coupled to the drive member by various methods, such as a belt, a chain or a worm gear, etc. As the motor is engaged, it causes the drive member to rotate and causes the motorized track and body component sections to extend or retract depending on the needs of the user. A variety of types of motors can be used such as AC, DC, brushed, brushless, stepper, or servo or other types as known to those of ordinary skill in the art. A remote actuation mechanism and control module may also be connected to the motor to control the movement, speed, and operation of the motor and thus operation of the retractable boat center console enclosure device.

In another embodiment, in addition to a motor or hydraulic lift, the drive member is attached to a crank, wheel or other device capable of manually causing the drive member to rotate. Manual rotation of the crank, wheel or other rotation device would extend or retract the retractable boat center console enclosure device as desired. In this example, a user desiring to extend the retractable boat center console enclosure device would grab one of body components with the track attached, while standing on the boat, and would pull the device toward the center of the hull.

In another embodiment, the retractable boat center console enclosure device is controlled hydraulically. In this embodiment, pistons would push rollers on the track, or wheels, or other means for moving on the track as is known in the art, to retract and expand the device, as needed.

In one embodiment, the retractable body component sections are telescoping sections that retract and expand. The telescoping sections comprise tubular sections of differing diameters allowing the lesser diameter tube the ability to be housed and slid into and out of the larger diameter tube. A position-locking spring-loaded pin is used to lock into position the tubular sections at the desired extended or retracted length. Telescoping is typically used for extensions to the center console extending the bow and/or stern. This device does not have this feature.

In one embodiment, the retractable boat center console enclosure device is in communication with a wireless communication module. The wireless communication module is connected to and controls the motor to retract and expand the body component sections. The wireless communication module is also wirelessly connected to a smartphone and a mobile application on the smartphone using Bluetooth. The present disclosure connects to the user's smartphone via BLE (Bluetooth low energy) and allows the user to control the device via their smartphone.

In one embodiment, the retractable boat center console enclosure device is part of the original manufacturing process. Also, the design and functionality of the device can be incorporated into the boat design when the hull is being poured to have the configuration of the hull and allowing contouring so a "deep V hull" would not be sufficient for contouring the shape of the device.

In one embodiment, the retractable boat center console enclosure device can be an aftermarket design and retrofitted on existing boats, as needed.

In yet another embodiment, the retractable boat center console enclosure device comprises a plurality of indicia.

In yet another embodiment, a method of covering a boat center console is disclosed. The method includes the steps of providing a retractable boat center console enclosure device comprising a body component configured in sections which act to cover the center console of the boat. The method also comprises positioning a double wall component on the port and starboard sides with a motorized track. Further, the method comprises raising the body component up over the gunnels of the sides to contour to the boat and meet in the center of the hull, approximately six feet in height. Finally, the method comprises securing the body component together where they meet in the center of the hull via snap fasteners.

Numerous benefits and advantages of this invention will become apparent to those skilled in the art to which it pertains, upon reading and understanding the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figures 1, 2:
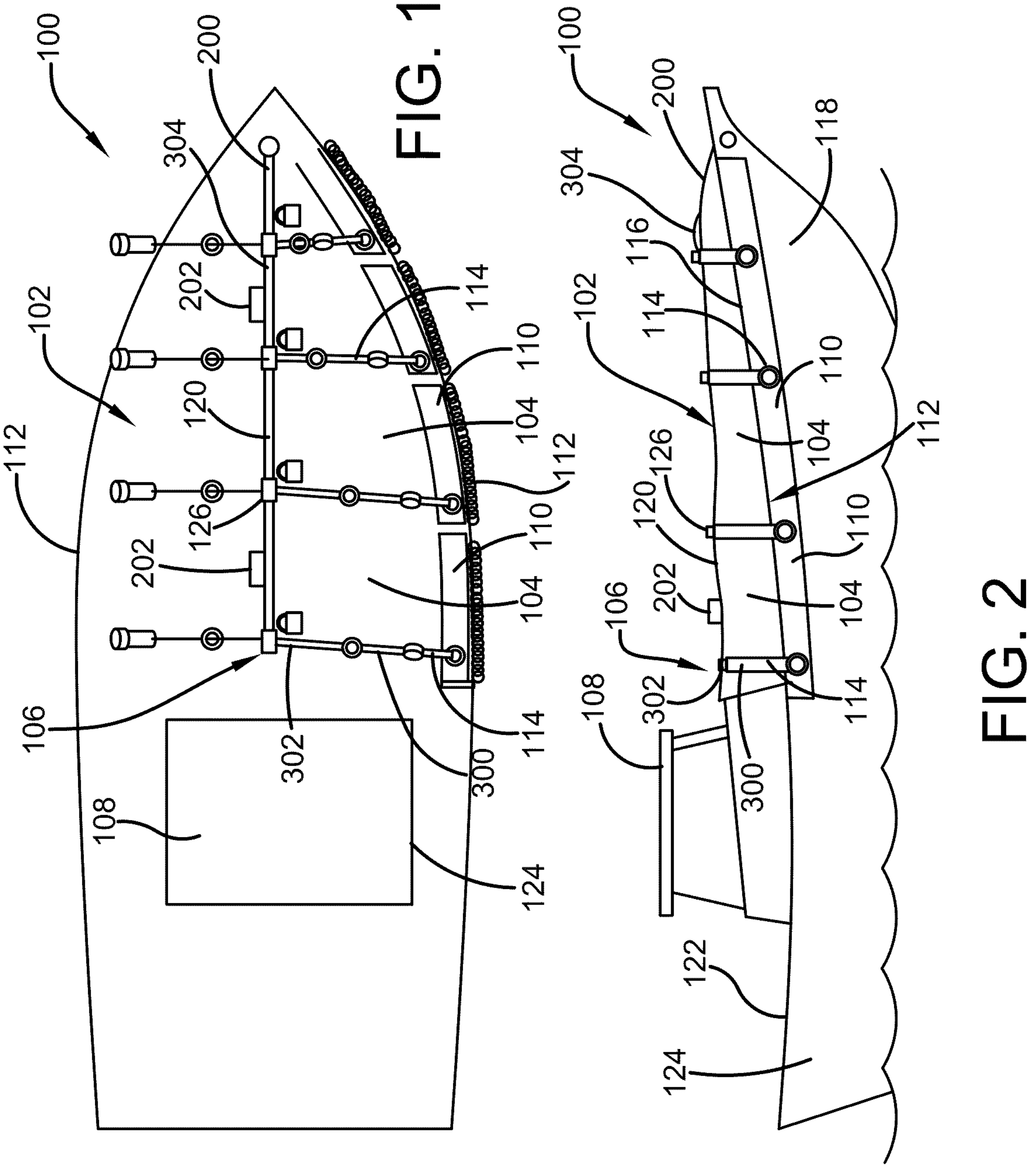
FIG. 1 illustrates a top perspective view of one embodiment of the retractable boat center console enclosure device of the present invention in accordance with the disclosed architecture.
FIG. 2 illustrates a side perspective view of one embodiment of the retractable boat center console enclosure device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a retractable boat center console enclosure device that provides users with a cover for a boat center console. There is also a long-felt need in the art for a retractable boat center console enclosure device that can be easily retracted and extended. Further, there is a long-felt need in the aft for a retractable boat center console enclosure device that can be extended/retracted manually, electronically, or hydraulically. Moreover, there is a long-felt need in the art for a device that is attached via snap fasteners. Further, there is a long-felt need in the art for a retractable boat center console enclosure device that is waterproof. Finally, there is a long-felt need in the art for a retractable boat center console enclosure device that is manufactured of poly carbon, poly fiber or another type of material in conjunction with marine vinyl.

The present invention, in one exemplary embodiment, is a novel retractable boat center console enclosure device. The device can be installed on an open center console of a boat. The retractable boat center console enclosure device comprises a body component that is configured in a plurality of sections which act to cover the center console of the boat. A double wall component is positioned in the port and starboard sides with a motorized track so that the body component could rise up over the gunnels of the sides to contour to the boat. The retractable sides then meet in the center of the hull approximately six feet in height to snap together. The present invention also includes a novel method of covering a boat center console. The method includes the steps of providing a retractable boat center console enclosure device comprising a body component configured in sections which act to cover the center console of the boat. The method also comprises positioning a double wall component on the port and starboard sides with a motorized track. Further, the method comprises raising the body component up over the gunnels of the sides to contour to the boat and meet in the center of the hull, approximately six feet in height. Finally, the method comprises securing the body component together where they meet in the center of the hull via snap fasteners.

Referring initially to the drawings, FIGS. 1-2 illustrate a perspective view of one embodiment of the retractable boat center console enclosure device 100 of the present invention. In the present embodiment, the retractable boat center console enclosure device 100 is an improved retractable boat center console enclosure device 100 that provides a user with a cover for a boat center console. Specifically, the retractable boat center console enclosure device 100 comprises a body component 102 that is configured in a plurality of sections 104 which act to cover the center console 106 of the boat 108. A double wall component 110 is positioned on the port and starboard sides 112 with a motorized track 114 so that the body component 102 could rise up over the gunnels 116 of the sides 112 to contour to the boat 108. The retractable body component sections 102, 104 then meet in the center (i.e., ridgeline 120) of the hull 118 approximately six to eight feet in height to snap together.

Generally, the retractable boat center console enclosure device 100 is a cover for a boat center console 106 that provides a portable cabin in inclement weather. The device 100 is easily retracted and extended, as needed. The device 100 can be installed on an open center console 106 of a boat 108, which the size of the vessel can range from approximately 40 to 65 feet. Further, the device 100 can be applied on any boat 108 that contains an open center console 106, as well as, catamarans and V-hull vessels, etc.

Further, the retractable boat center console enclosure device 100 is applied to a boat 108 with a deck 122 and gunnels 116, a frame structure 124, and an open center console 106. The retractable boat center console enclosure device 100 comprises a body component 102 that is configured in a plurality of sections 104 which act to cover the center console 106 of the boat 108. The sections 104 can be any suitable size and shape as needed. Accordingly, the dimensions and angles would vary with the size of the hull 118 and width of the boat 108.

Additionally, each side 112 of the boat 108 (i.e., port and starboard) comprises retractable body component 102 sections 104 that are of sufficient length to be capable of being extended from the side 112 of the boat 108 toward the center ridgeline 120, with a sufficient amount of material to overlap each other at the center ridgeline 120. Further, the retractable body component 102 sections 104 are secured together along the ridgeline 120 in the center of the hull 118 in an overlapping configuration via fasteners 126, such that the body component 102 is waterproof when extended in position over the center console area 106.

Typically, the body component 102 can be manufactured of a metal alloy, carbon fiber, plexi-glass, fiberglass, plastics, polymers, etc., or any other suitable material as is known in the art.

Further, the retractable body component 102 sections 104 are secured and stored within a double wall component 110. The double wall component 110 is positioned on the port and starboard sides 112 of the boat 108, along the center console area 106. The double wall component 110 can be any suitable shape and size as is known in the art and is positioned along the sides 112 of the boat 108 and acts to secure the retractable body component 102 sections 104 for storage and use.

Additionally, each double wall component 110 comprises a motorized track 114 secured to the body component 102 sections 104, allowing the body component 102 sections 104 to extend and retract, as needed. The motorized track 114 is secured to the body component 102 sections 104, which run along the length of the boat 108, spaced apart at a predetermined distance, such that the body component 102 sections 104 completely cover the center console area 106 when extended. Specifically, the retractable body component 102 sections 104 rise up over the gunnels 116 on the sides 112 to contour to the boat 108. The motorized track 114 then acts as a semi-rigid guide that allows the body component 102 sections 104 to cover and provide a portable cabin during inclement weather over the center console 106.

Generally, the retractable body component 102 is aerodynamically shaped or tapered toward the front 200, such that the device 100 does not create a flat wall or wind barrier, during use. However, the retractable body component 102 can be any suitable shape and size as is known in the art, when extended, depending on the wants and/or needs of a user.

Furthermore, the retractable body component 102, positioned on both sides 112 of the boat 108, then meets in the center of the hull 118 approximately six to eight feet in height to fasten together. Typically, the retractable body component 102 is secured together via snaps 126, Velcro, marine vinyl, etc. In another embodiment, the retractable body component 102 can be secured together via closure latches 202. Closure latches 202 are secured to the underside of the body component 102 ridgeline 120 (i.e., center). Closure latches 202 are similar to suitcase or toolbox latches and once secure, help to cinch the seam of the body component 102 sections 104 together tightly preventing water from getting in. Any suitable number of closure latches 202 can be utilized as is known in the art. Typically, four or five closure latches 202 are positioned along the body component 102 ridgeline 120, and thus evenly spaced along the seam of the device 100.

In one embodiment, a support pole 203 can be added in the center of the bow, after the retractable body component 102 is secured together. The support pole 203 can lend support to the enclosure device 100 in the event of heavy rains and/or rogue waves, to prevent the enclosure device 100 from collapsing.

Figure 3:
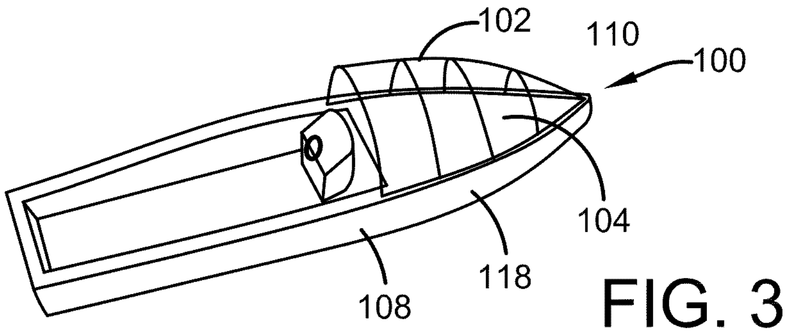
FIG. 3 illustrates a perspective view of one embodiment of the retractable boat center console enclosure device of the present invention showing the device in use in accordance with the disclosed architecture.

As shown in FIG. 3, the retractable body component 102 sections 104 each comprise a rubber overlap 300 to ensure the device 100 is waterproof. The rubber overlap 300 acts like a hinge on each side of the body component 102 sections 104 to ensure the top portion of the retractable body component 102 sections 104 fold inward with another section and rubber overlap 300 to create an overlapping seal, which prevents water from getting in. The retractable body component 102 sections 104 can also comprise a tortuous path seal, or other suitable seal that prevents water from getting in.

Further, the front 200 and the rear 302 of the device 100 would not be a solid piece, as it would have to be more flexible and have marine vinyl in the front tip 200 and the rear 302. Further, a piece of vinyl 304 can also be placed overtop the ridgeline seal 120, to keep water from running in under the convertible device 100. The piece of vinyl 304 can be secured via Velcro, snaps, adhesive, etc.

Figure 4A:
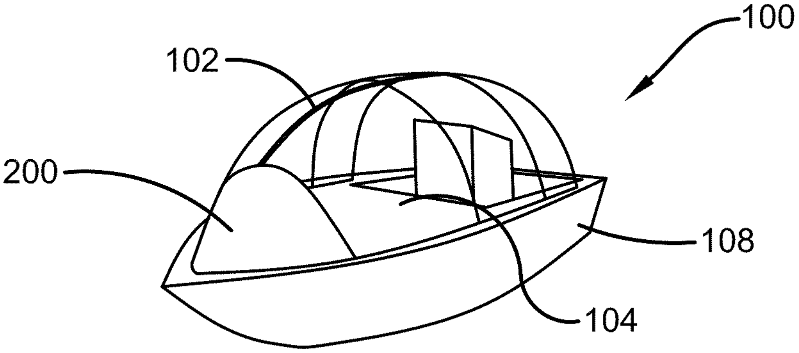
FIGS. 4A-C illustrate a perspective view of one embodiment of the retractable boat center console enclosure device of the present invention showing different views of the body component in accordance with the disclosed architecture.
Figure 4B:
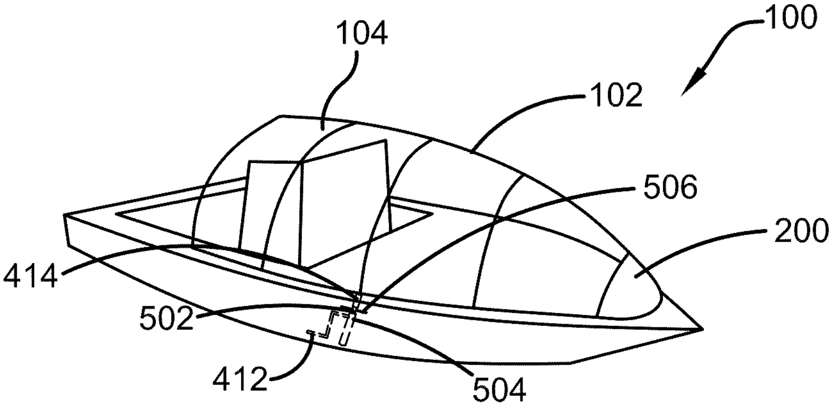
Figure 4C:
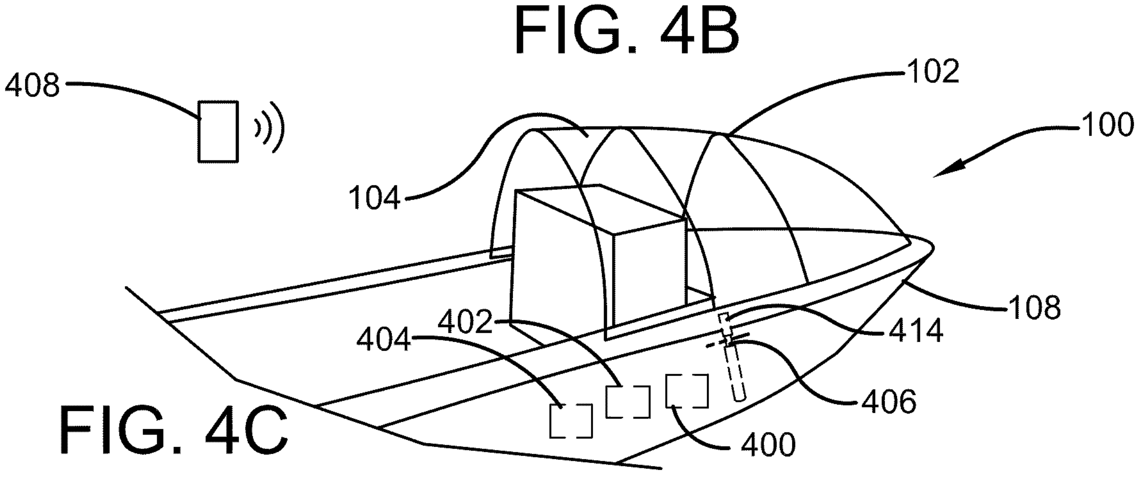

As shown in FIGS. 4A-C, operation of the retractable boat center console enclosure device 100 can be accomplished in many different ways, such as manually, electronically, or hydraulically, etc. Generally, the track 114 comprises a motor 400 connected to it, and a controller 402 connected to the motor 400 for controlling the motor 400. The controller 402 communicates with the motor 400 which controls the retraction and/or expansion of the body component 102 sections 104. In one embodiment, a rechargeable battery 404 is then connected to the controller 402 and provides a power source for the motor 400. In another embodiment, the motor 400 is powered via the boat's batteries and electronics (not shown).

Further, in one embodiment, the double wall components 110 comprise a drive member 406 which is coupled to the motor 400. The motor 400 is housed proximately to the drive member 406 and can be coupled to the drive member 406 by various methods, such as a belt, a chain or a worm gear, etc. As the motor 400 is engaged, it causes the drive member 406 to rotate and causes the motorized track 114 and body component 102 sections 104 to extend or retract depending on the needs of the user. A variety of types of motors 400 can be used such as AC, DC, brushed, brushless, stepper, or servo or other types as known to those of ordinary skill in the art. A remote actuation mechanism 408 and control module 410 may also be connected to the motor 400 to control the movement, speed, and operation of the motor 400 and thus operation of the retractable boat center console enclosure device 100.

In another embodiment, in addition, could be instead of a motor 400, the drive member 406 is attached to a crank 412, wheel or other device capable of manually causing the drive member 406 to rotate. Manual rotation of the crank 412, wheel or other rotation device would extend or retract the retractable boat center console enclosure device 100 as desired. In this example, a user desiring to extend the retractable boat center console enclosure device 100 would grab one of body components 102 with the track 114 attached, while standing on the boat 108, and would pull the device 100 toward the center of the hull 118.

In another embodiment, the retractable boat center console enclosure device 100 is controlled hydraulically. In this embodiment, pistons 414 would push rollers on the track 114, or wheels, or other means for moving on the track 114 as is known in the art, to retract and expand the device 100, as needed.

Figure 5A:
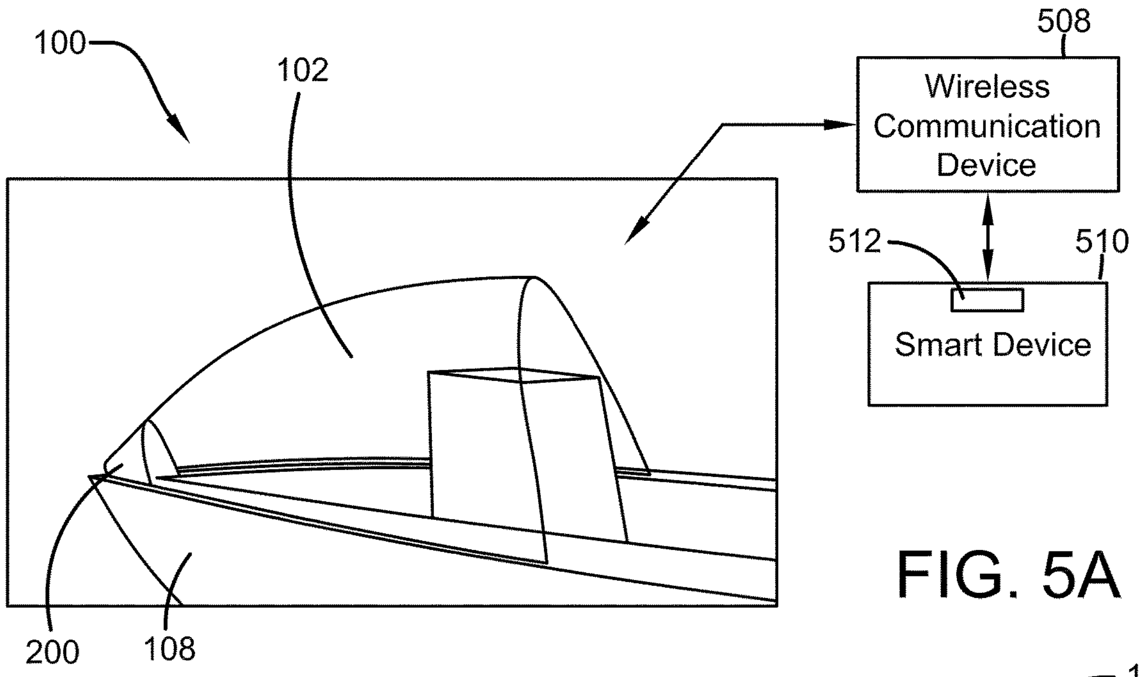
FIGS. 5A-C illustrate a perspective view of one embodiment of the retractable boat center console enclosure device of the present invention showing different views of the device in use in accordance with the disclosed architecture.
Figure 5B:
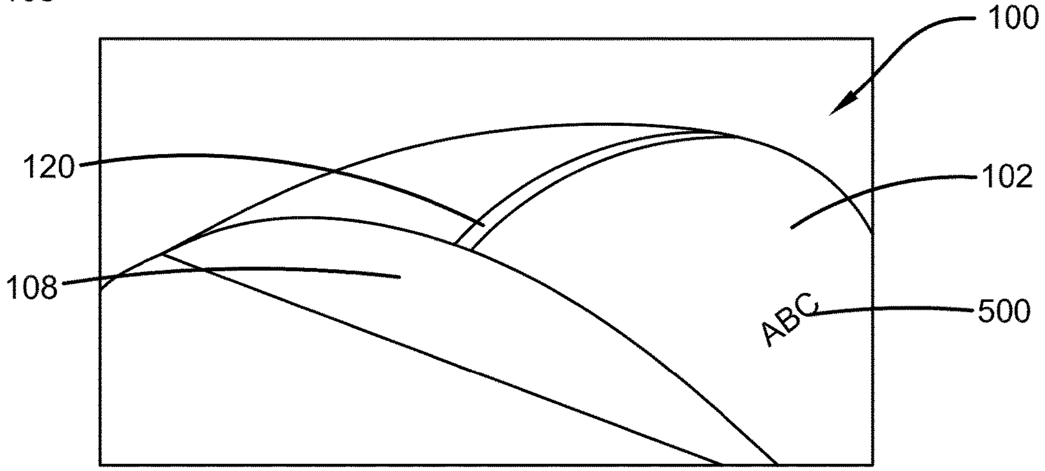
Figure 5C:
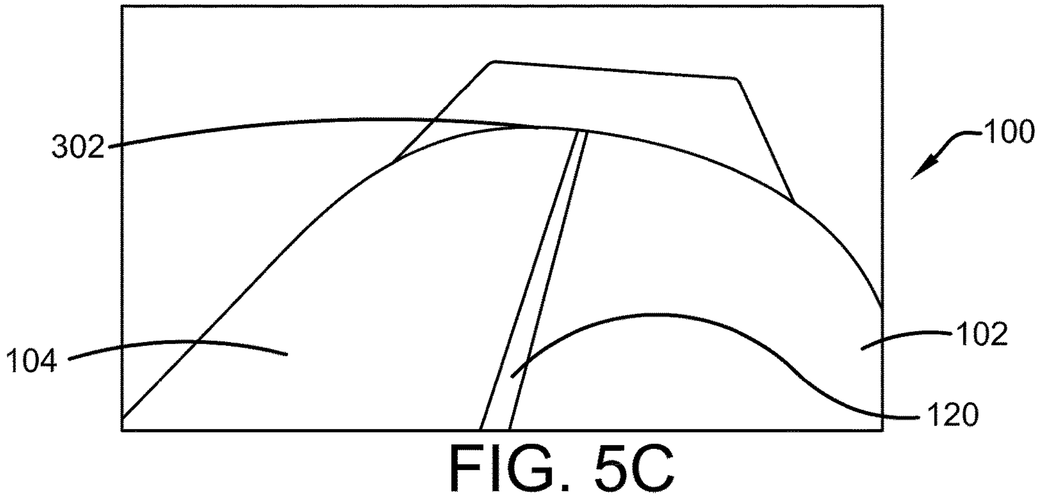

As shown in FIGS. 5A-C, in one embodiment, the retractable body component 102 sections 104 are telescoping sections 502 that retract and expand. The telescoping sections 502 comprise tubular sections 504 of differing diameters allowing the lesser diameter tube the ability to be housed and slid into and out of the larger diameter tube. A position-locking spring-loaded pin 506 is used to lock into position the tubular sections 504 at the desired extended or retracted length.

In another embodiment, the retractable boat center console enclosure device 100 is in communication with a wireless communication module 508. The wireless communication module 508 is connected to and controls the motor 400 to retract and expand the body component 102 sections 104. The wireless communication module 500 is also wirelessly connected to a smartphone 510 and a mobile application 512 on the smartphone 510 using Bluetooth. The present disclosure connects to the user's smartphone 510 via BLE (Bluetooth low energy) and allows the user to control the device 100 via their smartphone 510.

In one embodiment, the retractable boat center console enclosure device 100 is part of the original manufacturing process. Also, the design and functionality of the device 100 can be incorporated into the boat design when the hull 118 is being poured to have the configuration of the hull 118 and allowing contouring so a "deep V hull" would not be sufficient for contouring the shape of the device 100.

In another embodiment, the retractable boat center console enclosure device 100 can be an aftermarket design and retrofitted on existing boats 108, as needed.

In yet another embodiment, the retractable boat center console enclosure device 100 comprises a plurality of indicia 500. The body component 102 of the device 100 may include advertising, a trademark, or other letters, designs, or characters, printed, painted, stamped, or integrated into the body component 102, or any other indicia 500 as is known in the art. Specifically, any suitable indicia 500 as is known in the art can be included, such as but not limited to, patterns, logos, emblems, images, symbols, designs, letters, words, characters, animals, advertisements, brands, etc., that may or may not be boat, center console, or brand related.

Figure 6:
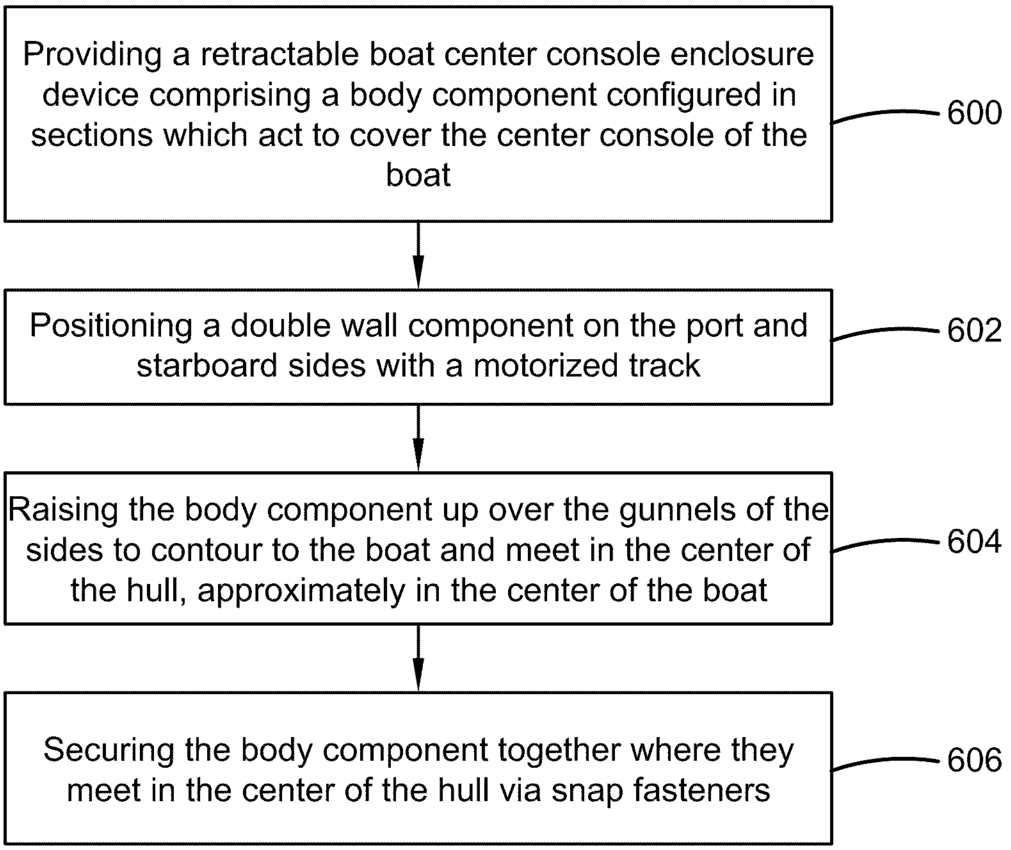
FIG. 6 illustrates a flowchart showing the method of covering a boat center console in accordance with the disclosed architecture.

FIG. 6 illustrates a flowchart of the method of covering a boat center console. The method includes the steps of at 600, providing a retractable boat center console enclosure device comprising a body component configured in sections which act to cover the center console of the boat. The method also comprises at 602, positioning a double wall component on the port and starboard sides with a motorized track. Further, the method comprises at 604, raising the body component up over the gunnels of the sides to contour to the boat and meet in the center of the hull, approximately six feet in height. Finally, the method comprises at 606, securing the body component together where they meet in the center of the hull via snap fasteners.

Certain terms are used throughout the following description and claims to refer to particular features or components. As one skilled in the art will appreciate, different users may refer to the same feature or component by different names. This document does not intend to distinguish between components or features that differ in name but not structure or function. As used herein "retractable boat center console enclosure device", "center console device", "boat device", and "device" are interchangeable and refer to the retractable boat center console enclosure device 100 of the present invention.

Notwithstanding the forgoing, the retractable boat center console enclosure device 100 of the present invention can be of any suitable size and configuration as is known in the art without affecting the overall concept of the invention, provided that it accomplishes the above stated objectives. One of ordinary skill in the art will appreciate that the retractable boat center console enclosure device 100 as shown in FIGS. 1-6 is for illustrative purposes only, and that many other sizes and shapes of the retractable boat center console enclosure device 100 are well within the scope of the present disclosure. Although the dimensions of the retractable boat center console enclosure device 100 are important design parameters for user convenience, the retractable boat center console enclosure device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A retractable boat center console enclosure device that provides a user with a cover for a boat center console, the retractable boat center console enclosure device comprising:

a body component configured in a plurality of sections;

a double wall component positioned on port and starboard sides of a boat, along a center console area; and a motorized track;

wherein the body component and the plurality of sections are secured within the double wall components on the motorized track;

wherein the body component and the plurality of sections are extended from the double wall components via the motorized track;

wherein the body component and the plurality of sections are extended from each of a port and starboard side of the boat to meet in a center ridgeline of a hull and are fastened together; and further wherein the body component and the plurality of sections act to cover the boat center console when fully extended.

2. The retractable boat center console enclosure device of claim 1, wherein the retractable boat center console enclosure device is installed on the boat center console of a boat ranging in size from approximately 40 to 65 feet.

3. The retractable boat center console enclosure device of claim 2, wherein the retractable boat center console enclosure device is applied to a boat with a deck and gunnels and a frame structure.

4. The retractable boat center console enclosure device of claim 3, wherein each of the port and starboard sides of the boat comprises the body component and the plurality of sections that are of sufficient length to be capable of being extended from each of the port and starboard sides of the boat toward the center ridgeline, with a sufficient amount of material to overlap each other at the center ridgeline to prevent water from getting in.

5. The retractable boat center console enclosure device of claim 4, wherein the body component and the plurality of sections are aerodynamically shaped toward a front of the boat.

6. The retractable boat center console enclosure device of claim 5, wherein the body component and the plurality of sections are positioned on each of the port and starboard sides of the boat, then extend to meet in the center ridgeline of the hull, approximately six to eight feet in height and are fastened together via snaps.

7. The retractable boat center console enclosure device of claim 6, wherein the body component and the plurality of sections are secured together at the center ridgeline via closure latches, which cinch a seam of the body component and the plurality of sections together tightly preventing water from getting in.

8. The retractable boat center console enclosure device of claim 7, wherein the body component and the plurality of sections each comprise a rubber overlap to create an overlapping seal, which prevents water from getting in.

9. The retractable boat center console enclosure device of claim 8, wherein a front and a rear of the body component and the plurality of sections would not be a solid piece, and an additional piece of vinyl can be placed overtop the seam, to keep water from running in.

10. The retractable boat center console enclosure device of claim 9, wherein the motorized track comprises a motor and a controller, wherein the controller communicates with the motor to control retraction and expansion of the body component and the plurality of sections.

11. The retractable boat center console enclosure device of claim 10, wherein a rechargeable battery is connected to the controller and provides a power source for the motor.

12. The retractable boat center console enclosure device of claim 11 further comprising a drive member coupled to the motor for extending and retracting the body component and the plurality of sections.

13. The retractable boat center console enclosure device of claim 12 further comprising a remote actuation mechanism and control module connected to the motor to control its operations.

14. The retractable boat center console enclosure device of claim 12, wherein the motor and the drive member are attached to a crank for manually extending and retracting the body component and the plurality of sections.

15. The retractable boat center console enclosure device of claim 12, wherein the motor is controlled hydraulically.

16. A retractable boat center console enclosure device that provides a user with a cover for a boat center console, the retractable boat center console enclosure device comprising:

a body component configured in a plurality of sections;

a double wall component positioned on each of a port and starboard sides of a boat, along the boat center console; and a motorized track comprising a motor and a controller, wherein the controller communicates with the motor to control retraction and expansion of the body component and the plurality of sections;

wherein the body component and the plurality of sections are secured within the double wall components on the motorized track;

wherein the body component and the plurality of sections are extended from the double wall components via the motorized track;

wherein each of the port and starboard sides of the boat comprises the body component and the plurality of sections that are of sufficient length to be capable of being extended from each of the port and starboard sides of the boat toward the center ridgeline, with a sufficient amount of material to overlap each other at the center ridgeline to prevent water from getting in;

wherein the body component and the plurality of sections are positioned on each of the port and starboard sides of the boat, then extend to meet in the center ridgeline of the hull, approximately six feet in height and are fastened together via snaps;

wherein the body component and the plurality of sections act to cover boat center console when fully extended;

wherein the body component and the plurality of sections each comprise a rubber overlap to create an overlapping seal, which prevents water from getting in; and further wherein a drive member is coupled to the motor for extending and retracting the body component and the plurality of sections.

17. The motorized boat center console enclosure device of claim 16, further comprising a support pole secured in center of a bow of the boat for added support of the body component and the plurality of sections.

18. The motorized boat center console enclosure device of claim 16 further comprising a wireless communication module connected to the motor and to a smartphone and a mobile application on the smartphone, such that a user controls the motor via their smartphone.

19. The motorized boat center console enclosure device of claim 16 further comprising a plurality of indicia.

20. A method of covering a boat center console, the method comprising the following steps:

providing a retractable boat center console enclosure device comprising a body component configured in sections which act to cover a boat center console;

positioning a double wall component on each of a port and starboard sides of a boat with a motorized track;

raising the body component up over the gunnels of each of the port and starboard sides to contour to the boat and meet in the center of a hull, approximately six to eight feet in height; and securing the body component together where they meet in the center of the hull via snap fasteners.

* * * * *